United States Patent
Izumi et al.

(10) Patent No.: US 10,607,780 B2
(45) Date of Patent: Mar. 31, 2020

(54) CERAMIC ELECTRONIC COMPONENT AND DIELECTRIC CERAMIC COMPOSITION

(71) Applicant: Murata Manufacturing Co., Ltd., Nagaokakyo-shi, Kyoto-fu (JP)

(72) Inventors: Tatsuya Izumi, Nagaokakyo (JP); Tomotaka Hirata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/671,644

(22) Filed: Aug. 8, 2017

(65) Prior Publication Data

US 2018/0047508 A1 Feb. 15, 2018

(30) Foreign Application Priority Data

Aug. 9, 2016 (JP) ................. 2016-156289

(51) Int. Cl.
*H01G 4/30* (2006.01)
*H01G 4/12* (2006.01)
(Continued)

(52) U.S. Cl.
CPC .............. *H01G 4/30* (2013.01); *C04B 35/14* (2013.01); *C04B 35/195* (2013.01); *C04B 35/64* (2013.01); *H01G 4/012* (2013.01); *H01G 4/10* (2013.01); *H01G 4/1227* (2013.01); *C04B 2235/3206* (2013.01); *C04B 2235/3213* (2013.01); *C04B 2235/3215* (2013.01); *C04B 2235/3217* (2013.01); *C04B 2235/3232* (2013.01);
(Continued)

(58) Field of Classification Search
CPC ............ H01G 4/232; H01G 4/30; H01G 4/10; H01G 4/012; H01G 4/1227; C04B 2235/3274; C04B 2235/3262; C04B 2235/3232; C04B 2235/3217; C04B 2235/3215; C04B 2235/3213; C04B 2235/3206; C04B 35/14
See application file for complete search history.

(56) References Cited

U.S. PATENT DOCUMENTS

2001/0019176 A1* 9/2001 Ahiko ................. H01G 4/012
257/777
2006/0246322 A1* 11/2006 Kawada ................. C04B 33/24
428/701

(Continued)

FOREIGN PATENT DOCUMENTS

JP          2004107202 A1    8/2004

*Primary Examiner* — David M Sinclair
(74) *Attorney, Agent, or Firm* — Arent Fox LLP

(57) ABSTRACT

A ceramic electronic component or a dielectric ceramic composition having a first element group and a second element group. The first element group consists of Ba, Si, and Al, and contains in 100 parts by weight of the first element group, 20 to 40 parts by weight of BaO, 48 to 75 parts by weight of $SiO_2$, and 5 to 20 parts by weight of $Al_2O_3$. The second element group consists of at least one of Ti and Fe, Mn, Sr, and Mg, and contains, with respect to 100 parts by weight of the first element group, 1 to 10 parts by weight of MnO, 1 to 35 parts by weight of SrO, 0.1 to 6 parts by weight of MgO, and 1 to 35 parts by weight of $TiO_2$ and/or $Fe_2O_3$.

7 Claims, 3 Drawing Sheets

(51) Int. Cl.
*C04B 35/195* (2006.01)
*H01G 4/012* (2006.01)
*C04B 35/64* (2006.01)
*C04B 35/14* (2006.01)
*H01G 4/10* (2006.01)
*H01G 4/232* (2006.01)

(52) U.S. Cl.
CPC .............. *C04B 2235/3262* (2013.01); *C04B 2235/3272* (2013.01); *C04B 2235/3274* (2013.01); *C04B 2235/6025* (2013.01); *C04B 2235/6562* (2013.01); *C04B 2235/6582* (2013.01); *C04B 2235/72* (2013.01); *H01G 4/232* (2013.01)

(56) References Cited

U.S. PATENT DOCUMENTS

| | | | | |
|---|---|---|---|---|
| 2009/0122506 | A1* | 5/2009 | Sugimoto | B32B 18/00 361/811 |
| 2011/0284270 | A1* | 11/2011 | Katsube | B32B 18/00 174/251 |
| 2011/0300355 | A1* | 12/2011 | Katsube | B32B 18/00 428/210 |
| 2014/0017587 | A1* | 1/2014 | Ueda | H01M 8/12 429/465 |
| 2016/0036016 | A1* | 2/2016 | Dahlmann | B23K 1/0016 429/179 |
| 2017/0076868 | A1* | 3/2017 | Noda | H01G 4/30 |
| 2018/0044244 | A1* | 2/2018 | Sugimoto | C04B 35/195 |

\* cited by examiner

US 10,607,780 B2

CERAMIC ELECTRONIC COMPONENT AND DIELECTRIC CERAMIC COMPOSITION

CROSS REFERENCE TO RELATED APPLICATIONS

The present application claims priority to Japanese Patent Application No. 2016-156289, filed Aug. 9, 2016, the entire contents of which are incorporated herein by reference.

BACKGROUND OF THE INVENTION

Field of the Invention

The present invention relates to a ceramic electronic component and a dielectric ceramic composition, and more specifically, to a ceramic electronic component having excellent temperature characteristics over a wide temperature region, and a dielectric ceramic composition used in the ceramic electronic component.

Description of the Related Art

In recent years, with the reduction in size and weight of electronic devices, multilayer ceramic capacitors having a small size and a large capacitance are widely used.

As such a multilayer ceramic capacitor, a temperature-compensating multilayer ceramic capacitor in which the change in capacitance with the change in temperature is linear has been known.

Japanese Patent Application Laid-Open No. 2004-107202 discloses a dielectric ceramic composition used in a temperature-compensating multilayer ceramic capacitor, and a temperature-compensating multilayer ceramic capacitor manufactured by using the same. Also, Japanese Patent Application Laid-Open No. 2004-107202 indicates temperature coefficients in the range from 25° C. to 85° C. of the multilayer ceramic capacitor according to the Example, and discloses that excellent temperature characteristics are achieved in the temperature range.

SUMMARY OF THE INVENTION

However, the range of 25° C. to 85° C. can be occasionally insufficient as the temperature region where the multilayer ceramic capacitor is used.

The present invention solves the aforementioned problem, and it is an object of the present invention to provide a ceramic electronic component having excellent temperature characteristics over a wide temperature region, and a dielectric ceramic composition used in the ceramic electronic component.

A ceramic electronic component of the present invention includes a laminate having a plurality of dielectric layers, and a plurality of internal electrodes laminated with the dielectric layers interposed therebetween, and a pair of external electrodes disposed outside the laminate, and electrically connected with an internal electrode extended on a surface of the laminate. The laminate has a first principal surface and a second principal surface that are opposed to each other in a thickness direction that is a laminating direction of the dielectric layers and the internal electrodes, a first end surface and a second end surface opposed to each other in a length direction in which the pair of external electrodes are opposed, and on which the external electrodes are disposed, and a first lateral surface and a second lateral surface opposed to each other in a width direction that is orthogonal to the thickness direction and the length direction.

The dielectric layer contains a first element group and a second element group. The first element group consists of Ba, Si, and Al, and contains in 100 parts by weight of the first element group wherein Ba is BaO, Si is $SiO_2$, and Al is $Al_2O_3$, 20 to 40 parts by weight of Ba, 48 to 75 parts by weight of Si, and 5 to 20 parts by weight of Al.

The second element group consists of at least one of Ti and Fe, Mn, Sr, and Mg, and contains with respect to 100 parts by weight of the first element group wherein Ba is BaO, Si is $SiO_2$, and Al is $Al_2O_3$, 1 to 10 parts by weight of Mn, 1 to 35 parts by weight of Sr, 0.1 to 6 parts by weight of Mg, and 1 to 35 parts by weight of at least one of Ti and/or Fe.

Preferably, Ba is 25 to 35 parts by weight, Si is 48 to 65 parts by weight, and Al is 10 to 15 parts by weight, Mn is 2 to 7 parts by weight, Sr is 3 to 7 parts by weight, Mg is 0.25 to 2 parts by weight, and at least one of the Ti and Fe is 3 to 7 parts by weight.

The internal electrode may have an opposed electrode portion where laminated internal electrodes are opposed to each other, and an extended electrode portion which is a portion extended from the opposed electrode portion to the first end surface or the second end surface. A distance between the opposed electrode portion and the first lateral surface and a distance between the opposed electrode portion and the second lateral surface in the width direction may be 5 μm to 30 μm, and the internal electrode may have a thickness of 1.0 μm to 5.0 μm.

The ceramic electronic component may have a dimension in the length direction of 0.2 mm to 2.0 mm, a dimension in the thickness direction of 0.1 mm to 1.2 mm, and a dimension in the width direction of 0.1 mm to 1.2 mm.

A dimension in the width direction of the ceramic electronic component may be larger than a dimension in the thickness direction of the ceramic electronic component.

A dielectric ceramic composition of the present invention includes a first element group and a second element group, and the first element group consists of Ba, Si, and Al, and contains in 100 parts by weight of the first element group wherein Ba is BaO, Si is $SiO_2$, and Al is $Al_2O_3$, 20 to 40 parts by weight of Ba, 48 to 75 parts by weight of Si, and 5 to 20 parts by weight of Al. The second element group consists of at least one of Ti and Fe, Mn, Sr, and Mg, and contains with respect to 100 parts by weight of the first element group wherein Ba is BaO, Si is $SiO_2$, and Al is $Al_2O_3$, 1 to 10 parts by weight of Mn, 1 to 35 parts by weight of Sr, 0.1 to 6 parts by weight of Mg, and 1 to 35 parts by weight of Ti and/or Fe.

According to the present invention, it is possible to realize a ceramic electronic component having excellent temperature characteristics over a wide temperature region. Also, by manufacturing, for example, a ceramic electronic component by using the dielectric ceramic composition according to the present invention, it is possible to manufacture a ceramic electronic component having excellent temperature characteristics over a wide temperature region.

DETAILED DESCRIPTION OF PREFERRED EMBODIMENTS OF THE INVENTION

Hereinafter, the features of the present invention will be described more specifically by showing an embodiment of the present invention.

In the following, description will be made while taking a multilayer ceramic capacitor as an example of the ceramic electronic component of the present invention.

Figure 1:
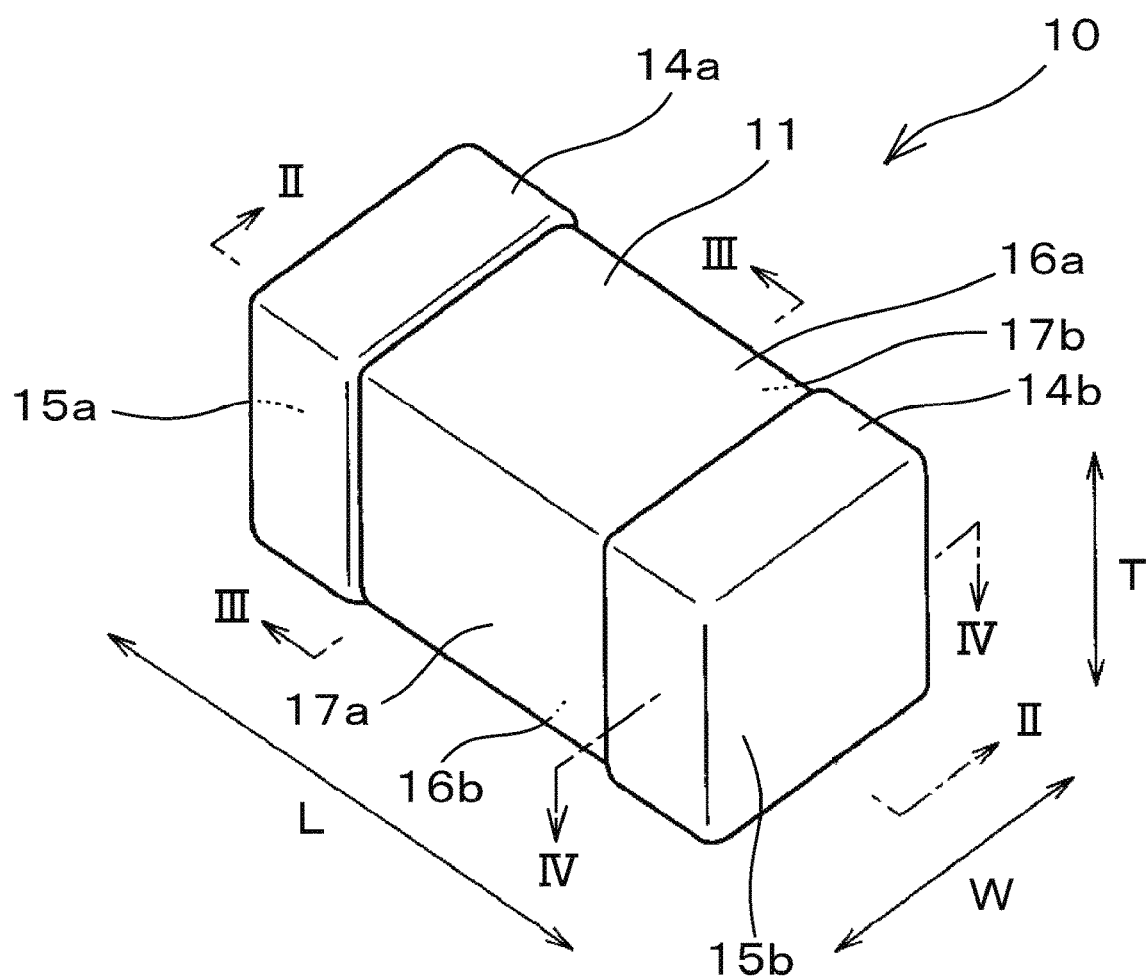
FIG. 1 is a perspective view of a multilayer ceramic capacitor in one embodiment.
Figure 2:
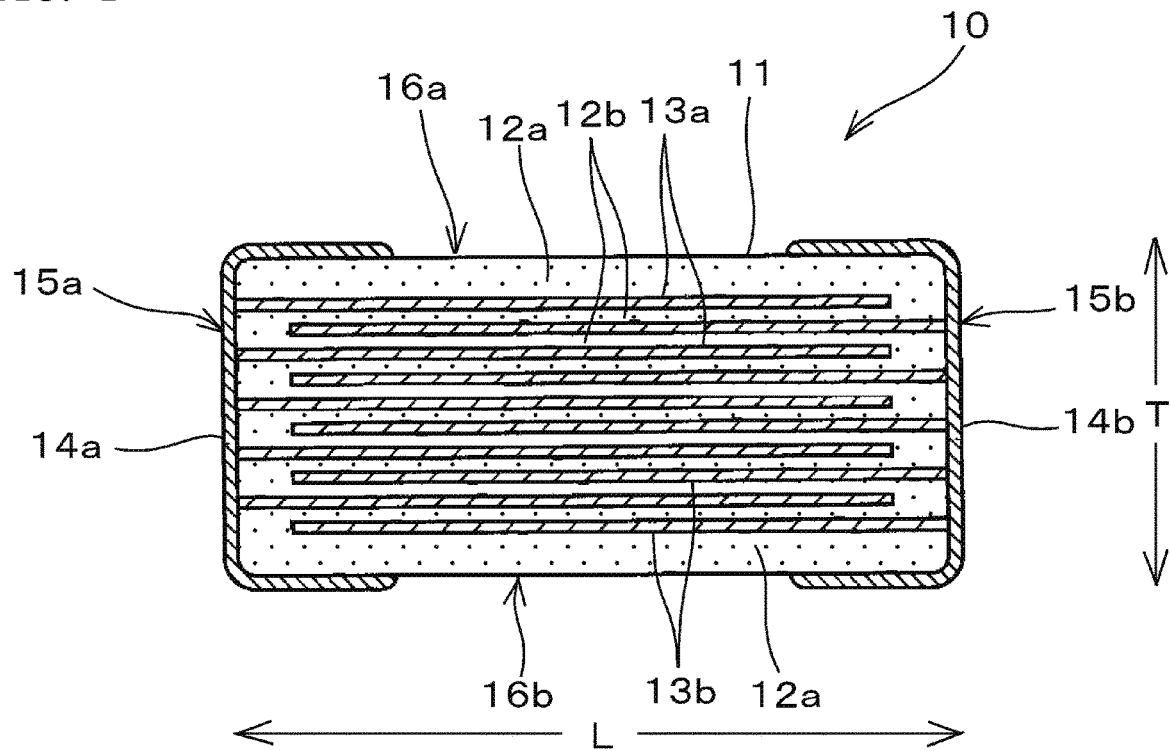
FIG. 2 is a section view taken along the II-II line of the multilayer ceramic capacitor shown in FIG. 1.
Figure 3:
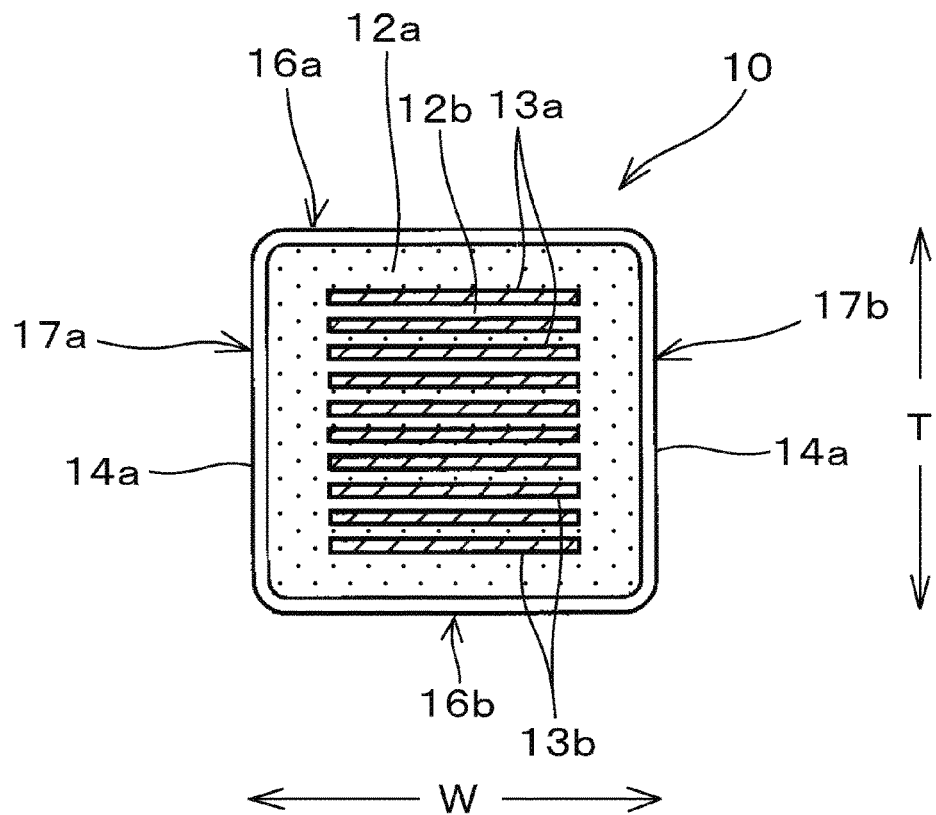
FIG. 3 is a section view taken along the III-III line of the multilayer ceramic capacitor shown in FIG. 1.
Figure 4:
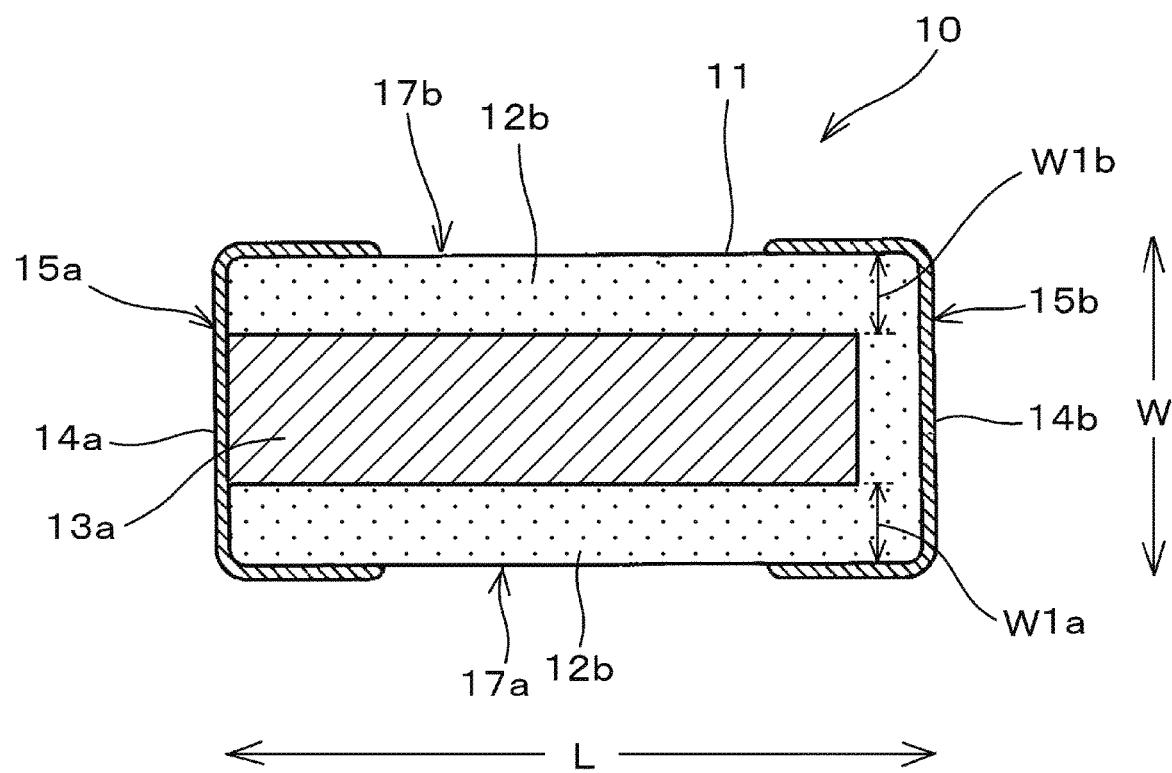
FIG. 4 is a section view taken along the IV-IV line of the multilayer ceramic capacitor shown in FIG. 1.

FIG. 1 is a perspective view of a multilayer ceramic capacitor 10 in one embodiment. FIG. 2 is a section view taken along the II-II line of the multilayer ceramic capacitor 10 shown in FIG. 1. FIG. 3 is a section view taken along the III-III line of the multilayer ceramic capacitor 10 shown in FIG. 1. FIG. 4 is a section view taken along the IV-IV line of the multilayer ceramic capacitor 10 shown in FIG. 1.

As shown in FIG. 1 to FIG. 4, the multilayer ceramic capacitor 10 is an electronic component having a rectangular parallelepiped shape as a whole, and has a laminate 11 and a pair of external electrodes 14 (14a, 14b). The pair of external electrodes 14 (14a, 14b) is disposed opposed to each other as shown in FIG. 1.

As shown in FIG. 2 and FIG. 3, the laminate 11 includes dielectric layers 12 that are alternately laminated, a first internal electrode 13a extended on the side of a first end surface 15a of the laminate 11, and a second internal electrode 13b extended on the side of a second end surface 15b as will be described later. That is, the plurality of dielectric layers 12 and the plurality of internal electrodes 13 (13a, 13b) are laminated alternately to form the laminate 11.

Here, the direction in which the pair of external electrodes 14 is opposed to each other is defined as a length direction of the multilayer ceramic capacitor 10, a laminating direction of the dielectric layers 12 and the internal electrodes 13 (13a, 13b) is defined as a thickness direction, and a direction orthogonal to both the length direction and the thickness direction is defined as a width direction.

The laminate 11 includes the first end surface 15a and the second end surface 15b that are opposed to each other in the length direction, a first principal surface 16a and a second principal surface 16b that are opposed to each other in the thickness direction, and a first lateral surface 17a and a second lateral surface 17b that are opposed to each other in the width direction. The first end surface 15a is provided with the external electrode 14a, and the second end surface 15b is provided with the external electrode 14b.

Preferably, corner parts and ridge parts of the laminate 11 are rounded. The corner part refers to the part where three surfaces of the laminate 11 intersect one another, and the ridge part refers to the part where two surfaces of the laminate 11 intersect with each other.

As shown in FIG. 2 and FIG. 3, the dielectric layers 12 constituting the laminate 11 include an outer layer part dielectric layer 12a and an inner layer part dielectric layer 12b. The outer layer part dielectric layer 12a is a dielectric layer located on the first principal surface 16a side and the second principal surface 16b side of the laminate 11, namely, on both outer sides in the thickness direction of the laminate 11. In other words, the outer layer part dielectric layer 12a includes dielectric layers respectively located between the first principal surface 16a, and the first internal electrode 13a nearest to the first principal surface 16a, and between the second principal surface 16b, and the second internal electrode 13b nearest to the second principal surface 16b.

The inner layer part dielectric layer 12b is a dielectric layer located between the first internal electrode 13a and the second internal electrode 13b.

The number of the inner layer part dielectric layers 12b constituting the laminate 11, namely, the number of the inner layer part dielectric layers 12b located between the first internal electrode 13a and the second internal electrode 13b is determined by the numbers of the first internal electrodes 13a and the second internal electrodes 13b. The outer layer part dielectric layer 12a is required separately from the inner layer part dielectric layers 12b.

Preferably, the thickness of the inner layer part dielectric layer 12b is for example, 1.0 μm to 5.0 μm. Preferably, the thickness of the outer layer part dielectric layer 12a is, for example, 10 μm or more.

The dielectric layer 12 contains a first element group and a second element group.

The first element group consists of Ba, Si, and Al, and in 100 parts by weight of the first element group, Ba, Si, and Al are contained in the following rates, respectively.

The content rate of Ba is 20 to 40 parts by weight.

The content rate of Si is 48 to 75 parts by weight.

The content rate of Al is 5 to 20 parts by weight.

Preferably, the Ba is from BaO, the Si is from $SiO_2$, and the Al is from $Al_2O_3$.

The second element group consists of at least one of Ti and Fe, Mn, Sr, and Mg, and with respect to 100 parts by weight of the first element group, the at least one of Ti and Fe, Mn, Sr, and Mg are contained in the following rates, respectively.

The content rate of at least one of Ti and Fe is 1 to 35 parts by weight. Since it is only required that at least one of Ti and Fe is contained, only Ti may be contained or only Fe may be contained. Also, both of Ti and Fe may be contained.

The content rate of Mn is 1 to 10 parts by weight.

The content rate of Sr is 1 to 35 parts by weight.

The content rate of Mg is 0.1 to 6 parts by weight.

Preferably, the Ti is from $TiO_3$, the Fe is from $Fe_2O_3$, the Mn is from MnO, the Sr is from SrO, and the Mg is from MgO.

By satisfying the condition that the dielectric layer 12 contains the first element group consisting of Ba, Si, and Al, and the second element group consisting of at least one of Ti and Fe, Mn, Sr, and Mg, and that the content rates of Ba, Si, and Al contained in the first element group and the content rates of at least one of Ti and Fe, Mn, Sr, and Mg contained in the second element group are the aforementioned rates (hereinafter, referred to as "Condition 1"), the multilayer ceramic capacitor 10 shows excellent temperature characteristics over a wide temperature range, for example, in the temperature range of −55° C. to 125° C. as will be described later.

It can be said that the dielectric layer 12 is configured by using a dielectric ceramic composition that contains the first element group consisting of Ba, Si, and Al, and the second element group consisting of at least one of Ti and Fe, Mn, Sr, and Mg, wherein the content rates of Ba, Si, Al, at least one of Ti and Fe, Mn, Sr, and Mg satisfy the Condition 1.

More preferably, the content rates of Ba, Si, and Al in 100 parts by weight of the first element group, and the content rates of the at least one of Ti and Fe, Mn, Sr, and Mg with respect to 100 parts by weight of the first element group are respectively the following rates (hereinafter, referred to as "Condition 2").

The content rate of Ba is 25 to 35 parts by weight.
The content rate of Si is 48 to 65 parts by weight.
The content rate of Al is 10 to 15 parts by weight.
The content rate of at least one of Ti and Fe is 3 to 7 parts by weight.
The content rate of Mn is 2 to 7 parts by weight.
The content rate of Sr is 3 to 7 parts by weight.
The content rate of Mg is 0.25 to 2 parts by weight.

Since the content rates of Ba, Si, and Al contained in the first element group, and the content rates of at least one of Ti and Fe, Mn, Sr, and Mg contained in the second element group satisfy the rates of the Condition 2, the multilayer ceramic capacitor 10 shows excellent temperature characteristics over a wide temperature range, and further improved moisture resistance as will be described later.

The content rates of individual elements can be determined by subjecting the dielectric layer 12 of the multilayer ceramic capacitor 10 to a dissolving treatment with a solvent to make a solution, and analyzing the solution by ICP analysis. The position where each element has situated in the dielectric layer 12 is not particularly limited.

When the first internal electrode 13a and the second internal electrode 13b do not contain elements constituting the first element group and the second element group, the content rates of individual elements contained in the dielectric layer 12, namely content rates of Ba, Si, and Al in 100 parts by weight of the first element group, and content rates of at least one of Ti and Fe, Mn, Sr, and Mg with respect to 100 parts by weight of the first element group can be determined individually by subjecting the laminate 11 to a dissolving treatment to make a solution, and analyzing the solution by ICP analysis.

Here, as a method of making the laminate 11 into a solution, for example, a method of dissolving the laminate 11 with acid to make a solution, and a method of dissolving in acid or the like to make a solution after conducting alkali fusion are recited. That is, there is no special restriction for the method of making a solution by a dissolving treatment.

When the first internal electrode 13a, the second internal electrode 13b, and the external electrode 14 do not contain elements constituting the first element group and the second element group, the content rates of individual elements contained in the dielectric layer 12 can be determined by subjecting the multilayer ceramic capacitor 10 to a dissolving treatment to make a solution, and analyzing the solution by ICP analysis.

As described above, the laminate 11 includes the first internal electrode 13a extended to the first end surface 15a side, and the second internal electrode 13b extended to the second end surface 15b side. The first internal electrode 13a and the second internal electrode 13b are disposed alternately with the inner layer part dielectric layer 12b interposed therebetween in the thickness direction.

The first internal electrode 13a includes an opposed electrode portion that is a part opposed to the second internal electrode 13b, and an extended electrode portion that is a portion extended from the opposed electrode portion to the first end surface 15a of the laminate 11. The second internal electrode 13b includes an opposed electrode portion that is a part opposed to the first internal electrode 13a, and an extended electrode portion that is a portion extended from the opposed electrode portion to the second end surface 15b of the laminate 11. By opposition of the opposed electrode portion of the first internal electrode 13a, and the opposed electrode portion of the second internal electrode 13b with the inner layer part dielectric layer 12b interposed therebetween, a capacitance is formed, and thus function as a capacitor is realized.

In order to obtain frequency characteristics that are independent of the mounting posture in the condition that the multilayer ceramic capacitor 10 is mounted, preferably, the positions of the end parts of the first internal electrode 13a and the second internal electrode 13b in the width direction are aligned in the laminating direction.

The first internal electrode 13a and the second internal electrode 13b contain, for example, Ni, Cu, Ag, Pd, alloy of Ag and Pd, and metal such as Au. In particular, for obtaining excellent frequency characteristics of the multilayer ceramic capacitor 10, it is preferred to use Cu as the first internal electrode 13a and the second internal electrode 13b. The first internal electrode 13a and the second internal electrode 13b may further contain dielectric grains having the same composition system with the ceramic contained in the dielectric layer 12.

Preferably, the thickness of the first internal electrode 13a and the second internal electrode 13b is 1.0 μm or more and 5.0 μm or less.

In the width direction of the laminate 11, a distance W1a between the opposed electrode portion of the internal electrode 13 (13a, 13b) and the first lateral surface 17a, and a distance W1b between the opposed electrode portion of the internal electrode 13 (13a, 13b) and the second lateral surface 17b (see FIG. 4) are preferably 30 μm or less. In the width direction of the laminate 11, by setting the distance W1a between the opposed electrode portion of the internal electrode 13 (13a, 13b) and the first lateral surface 17a, and the distance W1b between the opposed electrode portion of the internal electrode 13 (13a, 13b) and the second lateral surface 17b to be 30 μm or less, it is possible to make the dimension of the width direction of the internal electrode 13 larger, so that it is possible to realize low resistance, and it is possible to make the frequency characteristics of the multilayer ceramic capacitor 10 excellent.

Usually, it is desired to ensure a certain degree of size for the distance W1a and the distance W1b so that the distance between the end part in the width direction of the internal electrode 13 (13a, 13b), and the first lateral surface 17a or the second lateral surface 17b is not too small, or the end part in the width direction of the internal electrode 13 (13a, 13b) is not exposed on the first lateral surface 17a or the second lateral surface 17b. For example, the distance W1a and the distance W1b are preferably 5 μm or more.

The distance W1a between the opposed electrode portion of the internal electrode 13 (13a, 13b) and the first lateral surface 17a, and the distance W1b between the opposed electrode portion of the internal electrode 13 (13a, 13b) and the second lateral surface 17b can be measured by the following method. More specifically, the surface defined by the thickness direction and the width direction of the laminate 11, in other words, the first end surface 15a or the second end surface 15b that is a surface orthogonal to the length direction of the laminate 11 is ground to expose the internal electrode 13 (13a, 13b), and the distance between the exposed internal electrode 13 (13a, 13b), and the first lateral surface 17a or the second lateral surface 17b of the laminate 11 is measured by using an optical microscope.

The thickness of each of the plurality of dielectric layers 12 and the thickness of each of the plurality of internal electrodes 13 (13a, 13b) can be measured by the following method.

First, by grinding the surface defined by the thickness direction and the width direction of the laminate 11, in other words, the surface orthogonal to the length direction of the laminate 11, the section is exposed, and the section is observed under a scanning electron microscope (SEM). Then on a total of five lines including the center line along the thickness direction that passes the center of the exposed section, and respective two lines drawn at regular intervals on both sides from the center line, the thickness of the dielectric layer 12 is measured. A mean value of these five measurements is determined as the thickness of the dielectric layer 12.

For more accurate determination, the laminate 11 is divided into an upper part, a middle part, a lower part in the thickness direction, and the aforementioned five measurements are determined for each of the upper part, the middle part and the lower part, and a mean value of all the determined measurements is determined as the thickness of the dielectric layer 12.

While the method for measuring the thickness of the dielectric layer 12 has been described in the above, the thickness of the first internal electrode 13a and the second internal electrode 13b can be measured by using a scanning electron microscope (SEM) for the same section as that used for measuring the thickness of the dielectric layer by the method following the method for measuring the thickness of the dielectric layer 12.

The external electrode 14a is formed on the whole of the first end surface 15a of the laminate 11, and is formed in such a manner that it goes round from the first end surface 15a, to the first principal surface 16a, the second principal surface 16b, and the first lateral surface 17a, the second lateral surface 17b. The external electrode 14b is formed on the whole of the second end surface 15b of the laminate 11, and is formed in such a manner that it goes round from the second end surface 15b, to the first principal surface 16a, the second principal surface 16b, and the first lateral surface 17a, the second lateral surface 17b.

The one external electrode 14a is electrically connected with the first internal electrode 13a, and the other external electrode 14b is electrically connected with the second internal electrode 13b.

The external electrode 14 (14a, 14b) is provided with, for example, a base electrode layer, and a plating layer disposed on the base electrode layer.

The base electrode layer can be a layer containing at least one selected from layers including a baked electrode layer, a resin electrode layer, and a thin film electrode layer as will be described later.

The baked electrode layer is a layer containing glass and metal, and may be one layer or a plurality of layers. Examples of metal contained in the baked electrode layer include at least one selected from Cu, Ni, Ag, Pd, alloy of Ag and Pd, and Au.

The baked electrode layer is formed by applying a conductive paste containing glass and metal on the laminate, and baking the conductive paste. Baking may be conducted simultaneously with firing of the laminate 11, or may be conducted after firing of the laminate 11.

The base electrode layer may be, for example, a resin electrode layer containing conductive grains, and a thermosetting resin. When a resin electrode layer is formed, it may be directly formed on the laminate without forming a baked electrode layer. The resin electrode layer may be one layer or a plurality of layers.

The base electrode layer may be a layer including a thin film electrode layer as described above. The thin film electrode layer is, for example, a layer of 1 µm or less in which metal grains are deposited, and is formed by a known thin film forming method such as sputtering or vapor deposition method.

The plating layer disposed on the base electrode layer contains, for example, at least one of Cu, Ni, Ag, Pd, alloy of Ag and Pd, and Au. The plating layer may be one layer or a plurality of layers. Preferably, the plating layer has a two-layer structure consisting of a Ni plating layer and a Sn plating layer. The Ni plating layer functions to prevent the base electrode layer from being eroded by the solder in mounting the multilayer ceramic capacitor 10. The Sn plating layer functions to improve the wettability of the solder in mounting the multilayer ceramic capacitor 10.

The external electrode 14 may be provided with the plating layer that is directly disposed on the laminate 11 without being provided with the aforementioned base electrode layer. In this case, the plating layer is directly connected with the first internal electrode 13a or the second internal electrode 13b. In the following, the details of the plating layer will be described in the case where the external electrode 14 is not provided with the aforementioned base electrode layer, but provided with the plating layer directly formed on the laminate 11.

Preferably, the plating layer includes the first plating layer formed on the laminate 11, and the second plating layer formed on the first plating layer. When the plating layer is formed by electroless plating, a catalyst may be provided on the laminate 11.

Preferably, the first plating layer and the second plating layer contain, for example, one metal selected from the group consisting of Cu, Ni, Sn, Pb, Au, Ag, Pd, Bi, and Zn, or an alloy of such a metal.

For example, when Ni is used as the internal electrode, it is preferred to use Cu having excellent bondability with Ni as the first plating layer. Also, as the second plating layer, it is preferred to use Sn or Au having excellent solder wettability. As the first plating layer, Ni having solder barrier performance may be used.

The second plating layer can be formed as necessary. Therefore, the external electrode 14 may be provided with only the first plating layer. The external electrode 14 may further be provided with another plating layer formed on the second plating layer in addition to the first plating layer and the second plating layer.

The rate of metal per unit volume of the plating layer is preferably 99 vol % or more. Preferably, the plating layer does not contain glass. The plating layer are formed by grain growth along the thickness direction and are columnar.

When the dimension in the length direction of the multilayer ceramic capacitor 10 including the laminate 11 and the external electrode 14 is referred to as "length L", the dimension in the width direction is referred to as "width W", and the dimension in the thickness direction is referred to as "thickness T", for example, the multilayer ceramic capacitor 10 having the following dimension can be manufactured.

(Size 1) length L: 0.237 mm to 0.263 mm, width W: 0.112 mm to 0.138 mm, thickness T: 0.112 mm to 0.138 mm (Size 2) length L: 0.38 mm to 0.42 mm, width W: 0.18 mm to 0.22 mm, thickness T: 0.18 mm to 0.22 mm (Size 3) length L: 0.57 mm to 0.63 mm, width W: 0.27 mm to 0.33 mm, thickness T: 0.27 mm to 0.33 mm (Size 4) length L: 0.95 mm to 1.05 mm, width W: 0.45 mm to 0.55 mm, thickness T: 0.45 mm to 0.55 mm (Size 5) length L: 1.5 mm to 1.7 mm, width W: 0.7 mm to 0.9 mm, thickness T: 0.7 mm to 0.9 mm (Size 6) length L: 1.85 mm to 2.15 mm, width W: 1.05 mm to 1.35 mm, thickness T: 1.05 mm to 1.35 mm.

Preferably, the width W of the multilayer ceramic capacitor 10 is larger than the thickness T.

The length L, width W, and thickness T can be measured by using an optical microscope.

EXAMPLES

As materials constituting the main ingredient of the dielectric layer 12 of the multilayer ceramic capacitor 10, powder materials of $SiO_2$, $BaCO_3$, $Al_2O_3$, $MnCO_3$, $SrCO_3$, $TiO_2$, $Fe_2O_3$, $Mg(OH)_2$, and, $ZrO_2$ each having a purity of 99% or more were prepared.

The powder materials thus prepared were weighed so that the loading values as shown in Tables 1 to 3 were satisfied.

In Tables 1 to 3, the loading values of Si, Ba, and Al are indicated by content rates of Ba, Si, and Al by parts by weight in 100 parts by weight of the first element group wherein Ba is BaO, Si is $SiO_2$, and Al is $Al_2O_2$. As described above, the content rates of Ba, Si, and Al are numerical values in terms of BaO, $SiO_2$, and $Al_2O_3$, respectively.

In Tables 1 to 3, the loading values of Mn, Sr, Ti, Fe, and Mg are indicated by content rates of Mn, Sr, Ti, Fe, and Mg in parts by weight with respect to 100 parts by weight of the first element group wherein Ba is BaO, Si is $SiO_2$, and Al is $Al_2O_3$. As described above, the content rates of Mn, Sr, Ti, Fe, and Mg are numerical values in terms of MnO, SrO, $TiO_2$, $Fe_2O_3$, and MgO, respectively.

TABLE 1

| Sample No. | Si | Ba | Al | Mn | Sr | Ti | Fe | Mg | Sinterability | TCC (ppm/° C.) −55° C. | 125° C. | Number of NG in moisture resistance load life |
|---|---|---|---|---|---|---|---|---|---|---|---|---|
| *1 | 57 | 31 | 12 | 6.5 | 0 | 0.1 | 0 | 0.25 | ○ | 89 | 95 | 2/100 |
| *2 | 57 | 31 | 12 | 6 | 0 | 0.5 | 0 | 0.25 | ○ | 87 | 93 | 3/100 |
| *3 | 57 | 31 | 12 | 5 | 0 | 1.5 | 0 | 0.25 | ○ | 85 | 97 | 1/100 |
| *4 | 57 | 31 | 12 | 4 | 0 | 3 | 0 | 0.25 | ○ | 78 | 85 | 0/100 |
| *5 | 57 | 31 | 12 | 3 | 0 | 7 | 0 | 0.25 | ○ | 73 | 80 | 0/100 |
| *6 | 57 | 31 | 12 | 2 | 0 | 10 | 0 | 0.25 | ○ | 70 | 75 | 0/100 |
| *7 | 57 | 31 | 12 | 6.5 | 0.1 | 0.1 | 0 | 0.25 | ○ | 63 | 67 | 15/100 |
| *8 | 57 | 31 | 12 | 6 | 0.75 | 0.75 | 0 | 0.25 | ○ | 62 | 65 | 13/100 |
| 9 | 57 | 31 | 12 | 5 | 1 | 1 | 0 | 0.25 | ○ | 30 | 49 | 6/100 |
| 10 | 57 | 31 | 12 | 4 | 3 | 3 | 0 | 0.25 | ○ | 10 | 28 | 0/100 |
| 11 | 57 | 31 | 12 | 4 | 7 | 7 | 0 | 0.25 | ○ | −2 | 18 | 0/100 |
| 12 | 57 | 31 | 12 | 4 | 10 | 10 | 0 | 0.25 | ○ | −10 | 16 | 2/100 |
| 13 | 57 | 31 | 12 | 4 | 15 | 15 | 0 | 0.25 | ○ | −31 | 15 | 1/100 |
| 14 | 57 | 31 | 12 | 4 | 25 | 25 | 0 | 0.25 | ○ | −40 | 1 | 3/100 |
| 15 | 57 | 31 | 12 | 4 | 35 | 35 | 0 | 0.25 | ○ | −58 | −15 | 5/100 |
| *16 | 57 | 31 | 12 | 4 | 37.5 | 37.5 | 0 | 0.25 | x | | | |
| *17 | 57 | 31 | 12 | 4 | 0.1 | 4 | 0 | 0.25 | ○ | 22 | 43 | 11/100 |
| *18 | 57 | 31 | 12 | 4 | 0.75 | 4 | 0 | 0.25 | ○ | 19 | 40 | 13/100 |
| 19 | 57 | 31 | 12 | 4 | 1 | 4 | 0 | 0.25 | ○ | 17 | 34 | 5/100 |
| 20 | 57 | 31 | 12 | 4 | 3 | 4 | 0 | 0.25 | ○ | 5 | 21 | 0/100 |
| 21 | 57 | 31 | 12 | 4 | 7 | 4 | 0 | 0.25 | ○ | 1 | 15 | 0/100 |
| 22 | 57 | 31 | 12 | 4 | 10 | 4 | 0 | 0.25 | ○ | −10 | 6 | 1/100 |
| 23 | 57 | 31 | 12 | 4 | 15 | 4 | 0 | 0.25 | ○ | −32 | 2 | 1/100 |
| 24 | 57 | 31 | 12 | 4 | 25 | 4 | 0 | 0.25 | ○ | −35 | −6 | 3/100 |

TABLE 2

| Sample No. | Si | Ba | Al | Mn | Sr | Ti | Fe | Mg | Sinterability | TCC (ppm/° C.) −55° C. | 125° C. | Number of NG in moisture resistance load life |
|---|---|---|---|---|---|---|---|---|---|---|---|---|
| 25 | 57 | 31 | 12 | 4 | 35 | 4 | 0 | 0.25 | ○ | −45 | −10 | 2/100 |
| *26 | 57 | 31 | 12 | 4 | 37.5 | 4 | 0 | 0.25 | x | | | |
| *27 | 57 | 31 | 12 | 4 | 0.75 | 0 | 0.75 | 0.25 | ○ | 61 | 67 | 11/100 |
| 28 | 57 | 31 | 12 | 4 | 1 | 0 | 1 | 0.25 | ○ | 42 | 57 | 5/100 |
| 29 | 57 | 31 | 12 | 4 | 3 | 0 | 3 | 0.25 | ○ | 15 | 30 | 1/100 |
| 30 | 57 | 31 | 12 | 4 | 7 | 0 | 7 | 0.25 | ○ | −2 | 25 | 1/100 |
| 31 | 57 | 31 | 12 | 4 | 15 | 0 | 15 | 0.25 | ○ | −30 | 11 | 3/100 |
| *32 | 57 | 31 | 12 | 4 | 7 | 4 | 0 | | ○ | 5 | 28 | 10/100 |
| 33 | 57 | 31 | 12 | 4 | 7 | 4 | 0 | 0.1 | ○ | 1 | 27 | 5/100 |
| 34 | 57 | 31 | 12 | 4 | 7 | 4 | 0 | 0.25 | ○ | 2 | 27 | 0/100 |
| 35 | 57 | 31 | 12 | 4 | 7 | 4 | 0 | 1 | ○ | 4 | 24 | 0/100 |
| 36 | 57 | 31 | 12 | 4 | 7 | 4 | 0 | 2 | ○ | 0 | 24 | 0/100 |
| 37 | 57 | 31 | 12 | 4 | 7 | 4 | 0 | 4 | ○ | −1 | 29 | 1/100 |
| 38 | 57 | 31 | 12 | 4 | 7 | 4 | 0 | 6 | ○ | 6 | 35 | 3/100 |
| *39 | 57 | 31 | 12 | 4 | 7 | 4 | 0 | 6.5 | x | | | |
| *40 | 57 | 31 | 12 | 0.75 | 7 | 4 | 0 | 0.25 | x | | | |
| 41 | 57 | 31 | 12 | 1 | 7 | 4 | 0 | 0.25 | ○ | 5 | 26 | 3/100 |

TABLE 2-continued

| Sample No. | Si | Ba | Al | Mn | Sr | Ti | Fe | Mg | Sinterability | TCC (ppm/° C.) −55° C. | 125° C. | Number of NG in moisture resistance load life |
|---|---|---|---|---|---|---|---|---|---|---|---|---|
| 42 | 57 | 31 | 12 | 2 | 7 | 4 | 0 | 0.25 | ○ | 6 | 27 | 0/100 |
| 43 | 57 | 31 | 12 | 7 | 7 | 4 | 0 | 0.25 | ○ | 8 | 29 | 0/100 |
| 44 | 57 | 31 | 12 | 10 | 7 | 4 | 0 | 0.25 | ○ | 7 | 30 | 1/100 |
| *45 | 57 | 31 | 12 | 11.5 | 7 | 4 | 0 | 0.25 | ○ | 13 | 38 | 15/100 |
| *46 | 45 | 40 | 15 | 4 | 7 | 4 | 0 | 0.25 | x | | | |
| 47 | 48 | 40 | 12 | 4 | 7 | 4 | 0 | 0.25 | ○ | −8 | −60 | 2/100 |
| *48 | 48 | 43 | 9 | 4 | 7 | 4 | 0 | 0.25 | ○ | 51 | −54 | 13/100 |

TABLE 3

| Sample No. | Si | Ba | Al | Mn | Sr | Ti | Fe | Mg | Sinterability | TCC (ppm/° C.) −55° C. | 125° C. | Number of NG in moisture resistance load life |
|---|---|---|---|---|---|---|---|---|---|---|---|---|
| 49 | 52 | 40 | 8 | 4 | 7 | 4 | 0 | 0.25 | ○ | 18 | 53 | 0/100 |
| *50 | 52 | 43 | 5 | 4 | 7 | 4 | 0 | 0.25 | x | | | |
| 51 | 55 | 40 | 5 | 4 | 7 | 4 | 0 | 0.25 | ○ | 34 | 58 | 0/100 |
| *52 | 58 | 40 | 2 | 4 | 7 | 4 | 0 | 0.25 | ○ | 38 | 63 | 5/100 |
| 53 | 65 | 30 | 5 | 4 | 7 | 4 | 0 | 0.25 | ○ | 29 | −39 | 4/100 |
| *54 | 75 | 23 | 2 | 4 | 7 | 4 | 0 | 0.25 | ○ | 35 | 65 | 7/100 |
| *55 | 78 | 20 | 2 | 4 | 7 | 4 | 0 | 0.25 | ○ | 43 | 69 | 6/100 |
| 56 | 75 | 20 | 5 | 4 | 7 | 4 | 0 | 0.25 | ○ | 23 | 49 | 2/100 |
| *57 | 78 | 17 | 5 | 4 | 7 | 4 | 0 | 0.25 | x | | | |
| *58 | 75 | 17 | 8 | 4 | 7 | 4 | 0 | 0.25 | ○ | 57 | −45 | 11/100 |
| 59 | 68 | 20 | 12 | 4 | 7 | 4 | 0 | 0.25 | ○ | 37 | −22 | 4/100 |
| *60 | 63 | 17 | 20 | 4 | 7 | 4 | 0 | 0.25 | x | | | |
| 61 | 60 | 20 | 20 | 4 | 7 | 4 | 0 | 0.25 | ○ | 48 | −29 | 5/100 |
| *62 | 57 | 20 | 23 | 4 | 7 | 4 | 0 | 0.25 | x | | | |
| 63 | 54 | 26 | 20 | 4 | 7 | 4 | 0 | 0.25 | ○ | 51 | −20 | 3/100 |
| *64 | 48 | 29 | 23 | 4 | 7 | 4 | 0 | 0.25 | x | | | |
| 65 | 48 | 32 | 20 | 4 | 7 | 4 | 0 | 0.25 | ○ | 43 | −33 | 3/100 |
| *66 | 45 | 35 | 20 | 4 | 7 | 4 | 0 | 0.25 | x | | | |
| 67 | 48 | 36 | 16 | 4 | 7 | 4 | 0 | 0.25 | ○ | 35 | −20 | 5/100 |
| 68 | 65 | 25 | 10 | 4 | 7 | 4 | 0 | 0.25 | ○ | 3 | 29 | 0/100 |
| 69 | 50 | 35 | 15 | 4 | 7 | 4 | 0 | 0.25 | ○ | 9 | 27 | 0/100 |
| 70 | 55 | 35 | 10 | 4 | 7 | 4 | 0 | 0.25 | ○ | 7 | 26 | 0/100 |
| 71 | 60 | 25 | 15 | 4 | 7 | 4 | 0 | 0.25 | ○ | 5 | 25 | 0/100 |

The powder materials weighed so that the loading values shown in Tables 1 to 3 were satisfied were wet blended by a ball mill, and then dried, and crushed to obtain a powder. Then the obtained powder was calcined in atmosphere at a temperature of 750 to 1000° C. for 1 hour to 3 hours, and then crushed to obtain a material powder.

As the production method of the main ingredient of the dielectric layer 12, any method such as a solid phase method and a hydrothermal method can be used without particular restriction, and also as the form of the powder material, carbonates, oxides, hydroxide, chlorides and the like can be used without any particular restriction.

The material powder of the dielectric layer 12 may contain inevitable impurities such as $HfO_2$. In place of using $SrCO_3$ and $TiO_2$, $SrTiO_3$ may be used.

The obtained material powder was analyzed by ICP analysis, and it was confirmed that the compositions of the individual elements were substantially identical to the compositions shown in Tables 1 to 3. In Tables 1 to 3, the sample marked with * is a sample in which the content rate of Si, Ba, Al, Mn, Sr, Ti, Fe, or Mg does not satisfy the rate of the Condition 1, and the sample not marked with * is a sample in which the content rates of Si, Ba, Al, Mn, Sr, Ti, Fe, and Mg satisfy the content rates of the Condition 1.

In the whole composition, contents of Cr and B were examined, however, they were under detection limits. When YSZ balls are used, for example, in mixing the materials, the content of Zr can slightly increase due to contamination from the YSZ balls.

To this material powder, a polyvinyl butyral binder and an organic solvent such as toluene and ethanol were added and wet-blended by a ball mill, to prepare a slurry. Then the slurry was formed into a sheet by a doctor blade method, and cut to obtain a mother ceramic green sheet having a rectangular shape of 15 cm long, 15 cm wide and 4 μm thick.

Thereafter, a Cu-based conductive paste was applied on the mother ceramic green sheet, and an internal electrode pattern which is a conductive paste layer for configuring the first internal electrode 13a and the second internal electrode 13b was formed.

Subsequently, a plurality of mother ceramic green sheets on which the conductive paste layer was formed were stacked so that the side on which the conductive paste was extended up to the end part was arranged alternately in the directions having different length directions, to obtain a ceramic green sheet laminate which is a mother laminate.

The ceramic green sheet laminate was divided into individual chip elements by cutting at predetermined positions, and then heated to a temperature of 250° C. in atmosphere to burn the binder, and then fired in a non-oxidative atmosphere using nitrogen and hydrogen at a temperature elevation speed of 3.33 to 200° C./min., and at the highest firing temperature of 900° C. to 1040° C., to obtain a ceramic sintered body which is to be the laminate 11 in the multilayer ceramic capacitor of the present invention.

By barrel-finishing the ceramic sintered body, the internal electrode was exposed from the end surface, and a Cu paste for external electrode was applied on the part where the internal electrode was exposed. After drying the applied Cu paste, baking of the external electrode was conducted at a highest firing temperature of 800° C. under a reductive atmosphere. Subsequently, a Ni plating layer was formed on the external electrode by barrel plating, and a Sn plating layer was formed on the Ni plating layer in the same method.

As described above, a plating electrode may be formed directly on the ceramic sintered body without forming a base electrode layer. In this case, by barrel-finishing the ceramic sintered body, the internal electrode is exposed from the end surface, and a plating film for plating electrode is formed in the part where the internal electrode is exposed. For plating, any of the electrolytic plating and the electroless plating can be employed, however, the electroless plating requires a pretreatment such as addition of a catalyst for improving the plating deposition rate, so that the process is complicated. Therefore, it is preferred to employ the electrolytic plating. Also as a plating method, it is preferred to use barrel plating.

When the plating electrode is formed directly on the ceramic sintered body, a plating layer is formed on the surface of the formed plating electrode as necessary.

The outside dimension of the multilayer ceramic capacitor thus manufactured had a dimension L in the length direction of 2.0 mm, a dimension W in the width direction of 1.2 mm, and a dimension T in the thickness direction of 0.6 mm, and the thickness of the dielectric layer was 3.2 μm. Further, the total number of the inner layer part dielectric layers of the dielectric layer was 40.

The external electrode of the manufactured multilayer ceramic capacitor was removed by grinding, and the obtained laminate was made into a solution by alkali fusion, and the obtained solution was subjected to ICP analysis. Substantially the same preparation compositions as shown in Tables 1 to 3 were confirmed except for Cu which is a component of the internal electrode.

[Evaluated Characteristics]

For each sample of sample numbers 1 to 71 shown in Tables 1 to 3, sinterability, temperature characteristics, and occurrence of a defect after an accelerated moisture resistance load test as will be described later were examined.

(Sinterability)

A section was exposed by grinding the surface of the manufactured multilayer ceramic capacitor, and the section was observed under a scanning electron microscope with an observation magnification of 3000, to examine whether excellent sintering was conducted. In Tables 1 to 3, "◯" in the cell of sinterability indicates that the existing rate of pores formed in the sintered body is less than 5%, and excellent sintering has been conducted. On the other hand, "x" in the cell of sinterability indicates that a fine sintered body has not been obtained, or the existing rate of pores formed in the sintered body is 5% or more, or excessive sintering condition is observed.

(Temperature Characteristics)

Capacitance was measured in the range of −55° C. or more and 125° C. or less, at a frequency of 1 kHz, and a voltage of 1 Vrms, and temperature coefficients of capacitance (TCC) at −55° C. and 125° C. were calculated on the basis of 25° C. The sample showing a calculated temperature coefficient of capacitance of more than +60 ppm/° C., or less than −60 ppm/° C. is a sample that is unfavorable in temperature characteristics.

(Accelerated Moisture Resistance Load Life Test (PCBT))

An accelerated moisture resistance load life test was conducted in the conditions of a temperature of 120° C., a humidity of 100% RH, an atmospheric pressure of 2 atm, an applied voltage of 50 V, and the number of samples of 100, and after a lapse of 250 hours, the number of samples showing a value of log IR of the sixth power or less was counted, and the sample showing the counted number of 10% or more of the total number was determined as a defective. Tables 1 to 3 show the number of samples showing the NG results in the moisture resistance load life test among 100 samples, namely the number of samples showing a value of log IR of the sixth power or less.

As shown in Tables 1 to 3, in the samples in which the content rates of Si, Ba, Al, Mn, Sr, Ti, Fe, and Mg satisfy the rates of the Condition 1, namely, the samples that are not marked with *, sintering was sufficiently conducted, and a defect did not occur in the accelerated moisture resistance load test, and the temperature coefficients of capacitance at −55° C. and 125° C. fell within the range of −60 ppm/° C. or more and +60 ppm/° C. or less which are normal values.

That is, it was confirmed that the multilayer ceramic capacitor in which the dielectric layer 12 contains the first element group consisting of Ba, Si, and Al and the second element group consisting of at least one of Ti and Fe, Mn, Sr, and Mg, and the content rates of individual elements satisfy the rates of the Condition 1 shows excellent temperature characteristics over a wide temperature range of −55° C. or more and 125° C. or less.

On the other hand, in the samples in which the content rate of Si, Ba, Al, Mn, Sr, Ti, Fe, or Mg does not satisfy the rate of the Condition 1, namely, the samples that are marked with *, a defect occurred in at least in one item among the items of sinterability, accelerated moisture resistance load test, and temperature coefficients of capacitance at −55° C. and 125° C.

It was also found that among the samples in which the content rates of Si, Ba, Al, Mn, Sr, Ti, Fe, and Mg satisfy the rates of the Condition 1, particularly, in the samples in which the content rates of Ba, Si, and Al in 100 parts by weight of the first element group wherein Ba is BaO, Si is $SiO_2$, and Al is $Al_2O_3$, and the content rates of at least one of Ti and Fe, Mn, Sr, and Mg with respect to 100 parts by weight of the first element group wherein Ba is BaO, Si is $SiO_2$, and Al is $Al_2O_3$ respectively satisfy the following conditions, the temperature coefficients of capacitance at −55° C. and 125° C. are −30 ppm/° C. or more and +30 ppm/° C. or less after a lapse of 250 hours in the accelerated moisture resistance load test, and the temperature characteristics satisfy the CG characteristics of the JIS standard. The samples satisfying the following conditions are samples of sample No. 10, 11, 12, 20, 21, 22, 29, 30, 33, 34, 35, 36, 37, 41, 42, 43, 44, 68, 69, 70, and 71.

The content rate of Si is 48 to 65 parts by weight.
The content rate of Ba is 25 to 35 parts by weight.

The content rate of Al is 10 to 15 parts by weight.

The content rate of the at least one of Ti and Fe is 3 to 10 parts by weight.

The content rate of Mn is 1 to 10 parts by weight.

The content rate of Sr is 3 to 10 parts by weight.

The content rate of Mg is 0.1 to 4 parts by weight.

Further, it was found that in the samples satisfying the Condition 2 among the samples in which the content rates of Si, Ba, Al, Mn, Sr, Ti, Fe, and Mg satisfy the rates of the Condition 1, the number of samples that show the value of log IR of the sixth power or less after a lapse of 250 hours in the accelerated moisture resistance load test is 1% or less of the total number, revealing that the moisture resistance is further improved. The samples in which the content rates of Si, Ba, Al, Mn, Sr, Ti, Fe, and Mg satisfy the Condition 2 are samples of sample No. 10, 11, 20, 21, 29, 30, 34, 35, 36, 42, 43, 68, 69, 70, and 71.

In the above examples, a multilayer ceramic capacitor having a dimension L in the length direction of 2.0 mm, a dimension W in the width direction of 1.2 mm, a dimension T in the thickness direction of 0.6 mm was manufactured, and sinterability, temperature characteristics, and occurrence of a defect after the accelerated moisture resistance load test were examined. Besides the aforementioned size, samples having the aforementioned Sizes 1 to 6 were manufactured, and sinterability, temperature characteristics, and occurrence of a defect after the accelerated moisture resistance load test were examined, and similar results were obtained.

That is, it was confirmed that the multilayer ceramic capacitor having a dimension L in the length direction of 0.2 mm to 2.0 mm, a dimension T in the thickness direction of 0.1 mm to 1.2 mm, and a dimension W in the width direction of 0.1 mm to 1.2 mm shows excellent temperature characteristics over a wide temperature range of −55° C. to 125° C.

In the above embodiments, description has been made while taking a multilayer ceramic capacitor as an example of the ceramic electronic component, the ceramic electronic component is not limited to the multilayer ceramic capacitor. For example, the ceramic electronic component may be a multilayer board having a LC composite component, an internal capacitor and the like.

The present invention is not limited to the above embodiment also in other points, and can be applied or modified in various ways within the scope of the present invention.

What is claimed is:

1. A ceramic electronic component comprising:
   a laminate having a plurality of dielectric layers, and a plurality of internal electrodes laminated with dielectric layers of the plurality of dielectric layers interposed therebetween; and
   a pair of external electrodes disposed outside the laminate, each external electrode of the pair of external electrodes electrically connected with at least one respective internal electrode of the plurality of internal electrodes that is extended to a surface of the laminate,
   the laminate having a first principal surface and a second principal surface that are opposed to each other in a thickness direction corresponding to a laminating direction of the dielectric layers and the internal electrodes, a first end surface and a second end surface opposed to each other in a length direction in which the pair of external electrodes are opposed to each other, and on which the external electrodes are disposed, and a first lateral surface and a second lateral surface opposed to each other in a width direction that is orthogonal to the thickness direction and the length direction,
   the dielectric layer containing a first element group and a second element group,
   the first element group consisting of Ba, Si, and Al, when Ba is expressed in terms of BaO, Si is expressed in terms of $SiO_2$, Al is expressed in terms of $Al_2O_3$, and a total amount of BaO, $SiO_2$, and $Al_2O_3$ is 100 parts by weight,
   20 to 40 parts by weight of BaO,
   48 to 75 parts by weight of $SiO_2$, and
   5 to 20 parts by weight of $Al_2O_3$,
   the second element group consisting of at least one of Ti and Fe, Mn, Sr, and Mg, and when Mn is expressed in terms of MnO, Sr is expressed in terms of SrO, Mg is expressed in terms of MgO, Ti is expressed in terms of $TiO_2$, and Fe is expressed in terms of $Fe_2O_3$,
   MnO is 1 to 10 parts by weight with respect to the 100 parts by weight of the total amount of BaO, $SiO_2$, and $Al_2O_3$,
   SrO is 1 to 35 parts by weight with respect to the 100 parts by weight of the total amount of BaO, $SiO_2$, and $Al_2O_3$,
   MgO is 0.1 to 6 parts by weight with respect to the 100 parts by weight of the total amount of BaO, $SiO_2$, and $Al_2O_3$, and
   $TiO_2$ and/or $Fe_2O_3$ is 1 to 35 parts by weight with respect to the 100 parts by weight of the total amount of BaO, $SiO_2$, and $Al_2O_3$.

2. The ceramic electronic component according to claim 1, wherein the first element group contains,
   25 to 35 parts by weight of BaO,
   48 to 65 parts by weight of $SiO_2$, and
   10 to 15 parts by weight of $Al_2O_3$.

3. The ceramic electronic component according to claim 1, wherein the first element group contains,
   25 to 35 parts by weight of BaO,
   48 to 65 parts by weight of $SiO_2$, and
   10 to 15 parts by weight of $Al_2O_3$, and
   the second element group contains,
   2 to 7 parts by weight of MnO,
   3 to 7 parts by weight of SrO,
   0.25 to 2 parts by weight of MgO, and
   3 to 7 parts by weight of $TiO_2$ and/or $Fe_2O_3$.

4. The ceramic electronic component according to claim 1, wherein the second element group contains,
   2 to 7 parts by weight of MnO,
   3 to 7 parts by weight of SrO,
   0.25 to 2 parts by weight of MgO, and
   3 to 7 parts by weight of $TiO_2$ and/or $Fe_2O_3$.

5. The ceramic electronic component according to claim 1, wherein the plurality of internal electrodes have an opposed electrode portion where adjacent laminated internal electrodes are opposed to each other, and an extended electrode portion which extends from the opposed electrode portion to the first end surface or the second end surface,
   a distance between the opposed electrode portion and the first lateral surface and a distance between the opposed electrode portion and the second lateral surface in the width direction are 5 μm to 30 μm, and
   each of the plurality of internal electrodes have a thickness of 1.0 μm to 5.0 μm.

6. The ceramic electronic component according to claim 1, wherein
   the ceramic electronic component has a first dimension in the length direction of 0.2 mm to 2.0 mm,
   a second dimension in the thickness direction of 0.1 mm to 1.2 mm, and
   a third dimension in the width direction of 0.1 mm to 1.2 mm.

7. The ceramic electronic component according to claim 1, wherein a first dimension in the width direction of the ceramic electronic component is larger than a second dimension in the thickness direction of the ceramic electronic component.

* * * * *